US012528615B2

(12) United States Patent
Naing et al.

(10) Patent No.: US 12,528,615 B2
(45) Date of Patent: Jan. 20, 2026

(54) APPARATUS AND METHOD FOR ASEPTICALLY FILLING PHARMACEUTICAL CONTAINERS WITH A PHARMACEUTICAL FLUID USING ROTARY STAGE

(71) Applicant: VANRX PHARMASYSTEMS INC., Burnaby (CA)

(72) Inventors: Juvenal Naing, Belcarra (CA); Yacov Gofman, Richmond (CA); Marcin Cichy, Surrey (CA)

(73) Assignee: VANRX PHARMASYSTEMS INC., Burnaby (CA)

( * ) Notice: Subject to any disclaimer, the term of this patent is extended or adjusted under 35 U.S.C. 154(b) by 269 days.

(21) Appl. No.: 16/370,526

(22) Filed: Mar. 29, 2019

(65) Prior Publication Data

US 2020/0223573 A1 Jul. 16, 2020

Related U.S. Application Data

(62) Division of application No. 15/264,554, filed on Sep. 13, 2016.

(51) Int. Cl.
*B65B 3/00* (2006.01)
*B65B 43/50* (2006.01)
(Continued)

(52) U.S. Cl.
CPC ............ *B65B 55/027* (2013.01); *B65B 3/003* (2013.01); *B65B 43/50* (2013.01); *B65B 55/06* (2013.01); *B65B 55/10* (2013.01)

(58) Field of Classification Search
CPC ....... B65B 55/027; A61M 5/002; B65D 79/00
(Continued)

(56) References Cited

U.S. PATENT DOCUMENTS 3,292,342 A   12/1966  Martin
3,712,021 A    1/1973  Logemann
(Continued)

FOREIGN PATENT DOCUMENTS

CN   102100637 A   6/2011
CN   103193001 A   7/2013
(Continued)

OTHER PUBLICATIONS

European Patent Office, European Search Report (EP/17849957), Date of Issuance: Aug. 13, 2020.
(Continued)

*Primary Examiner* — Anthony D Stashick
*Assistant Examiner* — Raven Collins
(74) *Attorney, Agent, or Firm* — Kevin R. Erdman; Brannon Sowers & Cracraft PC (57) ABSTRACT

A system for filling nested pharmaceutical containers with a pharmaceutical fluid is disclosed. In one general aspect, it comprises a sterilizable chamber containing a planar rotary stage with a fiducial locating structure for holding a pharmaceutical container nest. The chamber has a rotatable cover removal station, a rotatable filling station with a dispenser head, and camera guided vacuum pickup facilities for handling container and closure nests. An associated method for filling the containers comprises establishing an aseptic condition within the chamber; removing covers from a container tub and a container closure tub by operating both the rotary stage and the cover removal station. The vacuum pickup facility transfers into the fiducial locating structure a container nest bearing pharmaceutical containers. The fluid is dispensed into the containers by operating both the rotary stage and the filling station. A container closure nest is placed on the container nest in the fiducial locating structure
(Continued)

with closures in correspondence with containers. A ram in the chamber forces the closures into the containers.

48 Claims, 7 Drawing Sheets

(51) Int. Cl.
 *B65B 55/02* (2006.01)
 *B65B 55/06* (2006.01)
 *B65B 55/10* (2006.01)
(58) Field of Classification Search
 USPC .................................................. 206/364, 370
 See application file for complete search history.

(56) References Cited

U.S. PATENT DOCUMENTS

| | | | | |
|---|---|---|---|---|
| 3,770,119 | A * | 11/1973 | Hultberg | A61B 50/30 |
| | | | | 206/439 |
| 3,954,174 | A * | 5/1976 | Kraus | A61B 50/30 |
| | | | | 206/439 |
| 4,444,310 | A * | 4/1984 | Odell | A61M 5/002 |
| | | | | 206/366 |
| 4,757,175 | A * | 7/1988 | Mohr | B29C 66/24244 |
| | | | | 156/272.4 |
| 5,519,984 | A | 5/1996 | Beussink | |
| 6,189,292 | B1 | 2/2001 | Odell | |
| 6,413,599 | B1 * | 7/2002 | Petricca | B65D 77/2044 |
| | | | | 428/424.4 |
| 7,096,896 | B2 | 8/2006 | Py | |
| 7,783,383 | B2 | 8/2010 | Eliuk | |
| 7,937,907 | B2 | 5/2011 | Fleckenstein | |
| 8,511,045 | B2 | 8/2013 | Mastio | |
| 8,842,280 | B2 | 9/2014 | Yamamoto | |
| 9,862,519 | B2 | 1/2018 | Deutschle et al. | |
| 2003/0092288 | A1 | 5/2003 | Yamamoto | |
| 2005/0160704 | A1 | 7/2005 | Miksch | |
| 2005/0252176 | A1 | 11/2005 | Pritchard | |
| 2006/0048844 | A1 | 3/2006 | Merrill | |
| 2006/0219359 | A1 | 10/2006 | Miyamoto | |
| 2006/0259195 | A1 | 11/2006 | Eliuk | |
| 2008/0017311 | A1 | 1/2008 | Yoshioka | |
| 2008/0087353 | A1 | 4/2008 | Py | |
| 2009/0202332 | A1 | 8/2009 | Trebbi | |
| 2009/0208316 | A1 | 8/2009 | Mayer | |
| 2009/0223592 | A1 | 9/2009 | Procyshyn | |
| 2010/0058711 | A1 | 3/2010 | Blumenstock | |
| 2010/0180551 | A1 | 7/2010 | Duethorn | |
| 2010/0281829 | A1 | 11/2010 | Leu | |
| 2011/0146841 | A1 | 6/2011 | Ansaloni et al. | |
| 2011/0202063 | A1 * | 8/2011 | Bonnin | A61B 17/8822 |
| | | | | 606/94 |
| 2011/0303063 | A1 * | 12/2011 | Stolyar | B26D 7/2635 |
| | | | | 83/76.1 |
| 2012/0090268 | A1 | 4/2012 | Krauss | |
| 2012/0110952 | A1 | 5/2012 | Zardini | |
| 2013/0240552 | A1 * | 9/2013 | Thomas | B65D 43/0268 |
| | | | | 220/806 |
| 2013/0281961 | A1 * | 10/2013 | Ray | A61M 3/0245 |
| | | | | 604/403 |
| 2013/0340390 | A1 | 12/2013 | Carson | |
| 2014/0092937 | A1 * | 4/2014 | Azad | A61B 50/30 |
| | | | | 374/E11.018 |
| 2014/0196411 | A1 | 7/2014 | Procyshyn | |
| 2014/0353190 | A1 * | 12/2014 | Okihara | B65D 1/22 |
| | | | | 206/370 |
| 2015/0045845 | A1 * | 2/2015 | Albright | A61N 1/046 |
| | | | | 220/270 |
| 2015/0232228 | A1 * | 8/2015 | Weissbrod | B65D 85/26 |
| | | | | 220/268 |
| 2016/0200461 | A1 | 7/2016 | Broadbent | |
| 2016/0206870 | A1 * | 7/2016 | Albright | B65D 17/502 |
| 2018/0072446 | A1 | 3/2018 | Naing | |
| 2018/0282008 | A1 | 10/2018 | Diaz Guerrero | |
| 2019/0016492 | A1 | 1/2019 | Guerrero | |
| 2019/0111435 | A1 | 4/2019 | Gong | |

FOREIGN PATENT DOCUMENTS

| | | |
|---|---|---|
| CN | 105271086 | 1/2016 |
| CN | 109803895 B | 11/2021 |
| DE | 102006039120 A1 | 3/2008 |
| EP | 2192042 A1 | 6/2010 |
| EP | 2812163 A2 | 12/2014 |
| JP | 061394 H | 11/1994 |
| JP | 2002-531259 A | 9/2002 |
| JP | 2012017137 | 1/2012 |
| KR | 10-2014-0110833 A | 9/2024 |
| WO | 2013156851 A2 | 10/2013 |
| WO | 2013156851 A3 | 10/2013 |
| WO | 2015023924 A2 | 2/2015 |
| WO | 2017072591 A1 | 5/2017 |

OTHER PUBLICATIONS

European Patent Office, Examination of the European Searching Authority, European Application No. EP/17849957, dated Jun. 16, 2020.
Canadian Intellectual Property Office (CIPO), PCT International Search Report (PCT/CA2017/051071), Date of Issuance: Nov. 23, 2017.
CIPO, Written Opinion of the International Searching Authority, International Application No. PCT/CA2017/051071, dated Dec. 11, 2017.
European Patent Office, Supplementary European Search Report and Annex for application EP19800042, Dec. 20, 2021, involving technology of the assignee of the present application.
Brazil Patent Office Search Report (BR112019004866 which claims priority to PCT/CA2017/051071, claiming priority to U.S. Appl. No. 15/264,554 which is a parent application of the present application). Date of Issuance: Dec. 28, 2021.
United States Patent and Trademark Office, Non-Final Office Action (U.S. Appl. No. 15/264,554 which is a parent application of the present application), Date of Issuance: Dec. 15, 2021.
United States Patent and Trademark Office, Final Office Action (U.S. Appl. No. 15/264,554 which is a parent application of the present application), Date of Issuance: Jul. 1, 2022.
China National Intellectual Property Administration Office Action and Search Report (Chinese national stage of PCT/CA2017/051071), corresponding to the subject matter of the present application. Date of Mailing: Sep. 6, 2022.
United States Patent and Trademark Office, Notice of Allowance for U.S. Appl. No. 17/005,178 (which is a Divisional of a Continuation-in-Part of the parent of the present application), Date of Issuance: Jul. 14, 2022.
European Patent Office, Examination Report for application EP17 849 957.0, Mar. 10, 2023, which is based on the priority application of the present application.
United States Patent and Trademark Office, Non-Final Office Action (U.S. Appl. No. 17/588,610 which is a parent application of the present application), Date of Issuance: Sep. 14, 2023.
Korean Intellectual Property Office, Notice of Preliminary Rejection (Non Final Office Action) (Korean Patent Application No. 10-2021-7016171, which is a priority application of the present application), Date of Issuance: Jun. 7, 2024.

* cited by examiner

```
                                                 ┌─ 2060
┌─────────────────────────────────────────────────────────────────────┐
│  Dispensing on an iterative and serial basis a pharmaceutical fluid substance │
│    into at least a portion of the plurality of pharmaceutical containers by   │
│       simultaneously operating the rotary stage and the filling station.      │
└─────────────────────────────────────────────────────────────────────┘
                                   │
                                                 ┌─ 2070
┌─────────────────────────────────────────────────────────────────────┐
│ Operating one of the at least one vacuum pickup systems and the rotary stage │
│   to transfer to the destination fiducial locating opening one of the at least one │
│        container closure nests bearing the plurality of pharmaceutical container │
│       closures and positioning the at least one closure nest to align closures with │
│                                 containers.                                      │
└─────────────────────────────────────────────────────────────────────┘
                                   │
                                                 ┌─ 2080
┌─────────────────────────────────────────────────────────────────────┐
│  Operating the rotary stage to jointly position the aligned container nest and │
│                    closure nest in the ramming system                          │
└─────────────────────────────────────────────────────────────────────┘
                                   │
                                                 ┌─ 2090
┌─────────────────────────────────────────────────────────────────────┐
│ Operating the ramming system to force the plurality of container closures into │
│                          the plurality of containers.                          │
└─────────────────────────────────────────────────────────────────────┘
```

FIG. 2b

APPARATUS AND METHOD FOR ASEPTICALLY FILLING PHARMACEUTICAL CONTAINERS WITH A PHARMACEUTICAL FLUID USING ROTARY STAGE

CROSS-REFERENCE TO RELATED APPLICATION

The present application is a Divisional Application of U.S. patent application Ser. No. 15/264,554, filed on Sep. 13, 2016, the disclosures of which are incorporated by reference herein.

BACKGROUND OF THE INVENTION

Field of the Invention

This present invention relates to the medical field and more particularly to apparatus and associated methods for sterilization of and sterile handling of pharmaceutical materials and containers for pharmaceuticals, including bringing pharmaceuticals into form for administration to medical or veterinary patients. In one aspect, it relates to the programmed and automatic operation of such apparatus.

Background

The subject of filling pharmaceuticals into pharmaceutical containers is a major aspect of the Pharmaceuticals Industry. The subject is heavily controlled by various governmental and official bodies in various countries. Technologically, the subject is a challenge in that the pharmaceutical products need to be filled into the containers under very strict aseptic conditions. Very specific procedures are specified for this task to a degree that makes the handling of pharmaceuticals profoundly different from the handling of any other industrial product, including specifically semiconductors, which also demand extreme and consistent environmental conditions. Indeed, the parallels between the handling of semiconductors in semiconductor "clean laboratories" and the handling of pharmaceuticals in aseptic isolators are superficial. They share the use of such "clean laboratories", but there is no inherent aseptic requirement associated with semiconductor manufacture.

The filling of pharmaceutical containers with fluid pharmaceuticals specifically requires the aseptic handling of both the containers and the fluid pharmaceutical itself. This leads to complex mechanisms and procedures, many of which may be automated to one degree or another. Often, the production equipment for fluid pharmaceutical handling is bulky and expensive. This creates a problem for smaller operations, particularly in the small-scale production and development environments. As the field has developed, the need for smaller, more compact equipment, particularly in the filling and compounding of fluid pharmaceuticals, has become evident.

The prior art is typically characterized by the use of vibratory bowls and escapements. Many prior art systems also employ gloves for use by the operator to access the interior of the chamber.

SUMMARY OF THE INVENTION

In one general aspect, the invention features a method for filling nested pharmaceutical containers with a pharmaceutical fluid substance, such as a liquid, solution, or suspension having therapeutic properties. The method includes providing a filling system comprising a sterilizable chamber capable of maintaining an aseptic condition, with the chamber comprising a filling station and a planar rotary stage having a destination fiducial locating structure including constraining surfaces. The method also includes transferring into the chamber at least one container tub sealed by a container tub cover and containing a container nest bearing a plurality of pharmaceutical containers, aseptically sealing the chamber, and establishing an aseptic condition within the chamber. The container nest bearing the plurality of pharmaceutical containers is transferred into the destination fiducial locating structure such that the container nest is held in place by the constraining surfaces, and the pharmaceutical fluid substance is dispensed into at least a portion of the plurality of pharmaceutical containers by operating both the rotary stage and the filling station.

In preferred embodiments the operating the filling station can include rotating the filling station. The dispensing the pharmaceutical fluid substance can comprise dispensing the pharmaceutical fluid substance on an iterative and serial basis into the containers. Providing a filling system can comprise providing a filing apparatus comprising at least one cover removal station within the chamber, with the transferring into the destination fiducial locating structure the container nest comprising removing the container tub cover from the container tub by operating both the rotary stage and the at least one cover removal station. Operating the at least one cover removal station can comprise rotating the at least one cover removal station. Providing the filling system can comprise providing within the chamber at least one cover removal station having an engagement tool, transferring into the chamber at least one container tub can comprise attaching to the container tub cover a cover removal fixture, and operating the at least one cover removal station can comprise engaging the engagement tool with the cover removal fixture. The method can further comprise transferring into the chamber a container closure tub sealed by a container closure tub cover and containing at least one container closure nest bearing a plurality of pharmaceutical container closures. The method can further comprise positioning one of the at least one closure nests to align closures in the at least one closure nest with corresponding containers in the container nest, transferring the nests of aligned closures and containers to the ramming station by rotating the rotary stage, and forcing the closures into the corresponding containers. Positioning one of the at least one closure nests can comprise obtaining image information about the one of the at least one closure nest, and positioning the one of the at least one closure nests based on the image information. Positioning one of the at least one closure nest can comprise applying a vacuum to suction cups, lifting the container closure nest with the suction cups, and operating the rotary stage. Transferring into the destination fiducial locating opening the container nest can comprise applying a vacuum to suction cups, lifting the container nest with the suction cups, and operating the rotary stage. Dispensing the pharmaceutical fluid substance can comprise simultaneously and/or serially operating the rotary stage and the filling station, and removing the container tub cover can comprise simultaneously and/or serially operating the rotary stage and the at least one cover removal station.

In another general aspect, the invention features a system for filling nested pharmaceutical containers with a pharmaceutical fluid substance comprising a sterilizable chamber capable of maintaining an aseptic condition. The chamber includes a filling station, and a planar rotary stage having a rotary stage rotation axis and comprising a destination fiducial locating structure including constraining surfaces disposed and shaped to receive and hold a pharmaceutical container nest bearing a plurality of pharmaceutical containers.

In preferred embodiments the filling station can comprise a fluid product dispenser head, with the filling station being configured to be rotatable about a filling station rotation axis parallel to the rotary stage rotation axis to position in combination with rotation of the rotary stage the dispenser head over any one of the plurality of pharmaceutical containers held in the container nest in the destination fiducial locating structure. The chamber can further comprise at least one cover removal station and the rotary stage can further comprise a first source fiducial locating structure including constraining surfaces disposed and shaped to receive and hold a pharmaceutical container closure tub sealed by a container closure tub cover and containing at least one pharmaceutical container closure nest bearing a plurality of pharmaceutical container closures, and at least one second source fiducial locating opening disposed and shaped to receive and hold a pharmaceutical container tub sealed by a container tub cover and containing a pharmaceutical container nest bearing a plurality of pharmaceutical containers. The at least one cover removal station can be disposed and configured to be rotatable about a cover removal station rotation axis parallel to the rotary stage rotation axis to remove in combination with rotation of the rotary stage the container tub cover from the at least one container tub and the container closure tub cover from the container closure tub. At least one cover removal station can comprise an engagement tool disposed and configured to engage with engagement fixtures pre-attached to the container tub cover and to the container closure tub cover. The system can further comprise at least one camera disposed to obtain image information about at least one of the container nest and the closure nest, and a controller, with the chamber further comprising at least one vacuum pickup system comprising suction cups disposed to engage with the container nests and the container closure nests, the at least one vacuum pickup system being configured in combination with rotation of the rotary stage to lift a pharmaceutical container nest from a pharmaceutical container tub held in one of the at least one second source fiducial locating openings and to deposit the pharmaceutical container nest in the destination fiducial locating opening in combination with rotation of the rotary stage and to lift a pharmaceutical container closure nest from a pharmaceutical container closure tub held in the first source fiducial locating opening and to deposit the container closure nest on top of the pharmaceutical container nest under control of the controller. The controller can be operative to instruct the at least one camera to provide to the controller the image information and the controller can be operative to control the rotation of the rotary stage to place the closures in the closure nest in correspondence with containers in the container nest. The system can further comprise a ram system configured for forcing the closures into the corresponding containers. The system can further comprise at least one rotatable cover removal station having a cover removal station rotation axis parallel to the rotary stage rotation axis, at least one vacuum pickup system for placing the container closure nest on the container nest with closures in the closure nest in correspondence with containers in the container nest, and a ram system for forcing the closures into the containers, with the filing station being a rotatable filling station having a filling station rotation axis parallel to the rotary stage rotation axis and comprising a fluid product dispenser head. The system can further comprise at least one camera for obtaining image information of at least one of the container nest and the closure nest, and a controller comprising a memory and a processor. The controller can be operative to instruct the rotary stage to rotate to angular positions that are one of predetermined and based on the image information and to control the at least one cover removal station, the filling station, the at least one vacuum pickup system, and the ram system to operate in conjunction with the rotary stage.

In a further general aspect, the invention features a system for filling nested pharmaceutical containers with a pharmaceutical fluid substance that includes means for establishing and maintaining an aseptic condition in a chamber, means for constraining a container nest bearing a plurality of pharmaceutical containers in the chamber, and means for transferring a container nest to the means for constraining from a container tub in the chamber. It also includes means for rotating the means for constraining in the chamber; and means for dispensing the pharmaceutical fluid substance into at least a portion of the plurality of pharmaceutical containers in the container nest while the container nest is constrained by the means for constraining.

Systems and methods according to the invention need not employ either vibratory bowls or escapements. Nor do such systems or method require gloves. Systems and methods according to the invention can therefore address needs for compact, small-scale filling and compounding of fluid pharmaceuticals.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts are also representative in nature, and actual embodiments of the invention may include further features or steps not shown in the drawings. The exemplifications set out herein illustrate embodiments of the invention, in one or more forms, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

Figure 1A:
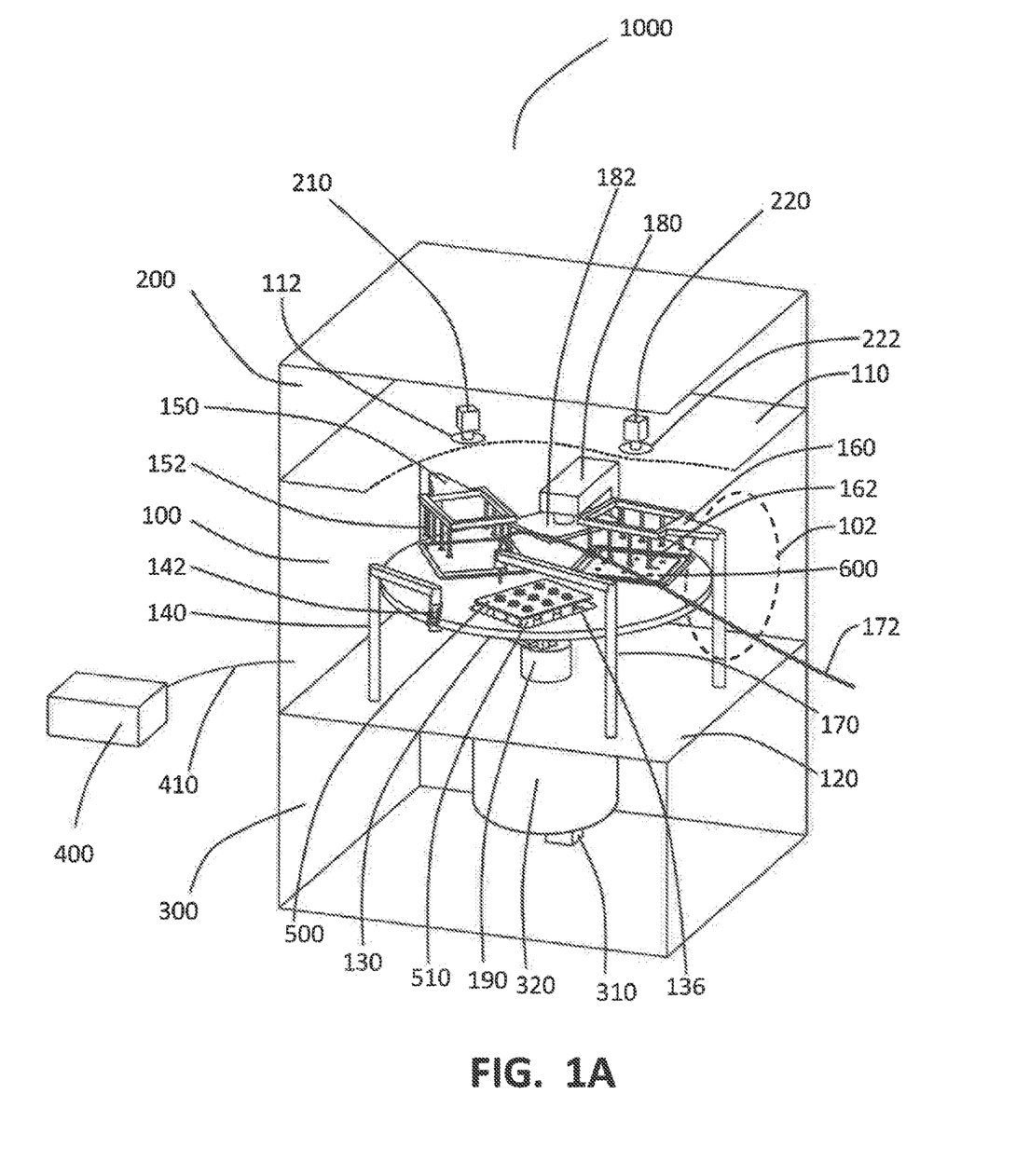
FIG. 1A is a drawing of an apparatus for filling pharmaceutical containers with a pharmaceutical fluid product. For the sake of clarity some surfaces are shown in cutaway form and others are shown as transparent.

The present invention relates to an apparatus and method for filing pharmaceutical containers with a pharmaceutical fluid substance in a spatially constrained environment. In FIG. 1A, a filling system 1000 comprises a sealable chamber 100 in communication with an ambient environment, the sealable chamber 100 being capable of having an aseptic environment established within its interior and capable of maintaining that aseptic environment within its interior. The interior of sealable chamber 100 may be rendered aseptic by any one or more of a number of treatments, including but not limited to treatment with a sterilant, such as steam, hydrogen peroxide vapor, ozone, nitrogen dioxide, and ethylene oxide. The structures and mechanisms to perform such sterilization steps are well known in the art and are not shown in FIG. 1A.

Chambers 200 and 300 are separated from chamber 100 by upper wall 110 and lower wall 120 respectively and are not required to be capable of maintaining aseptic environments within their interiors. The communication of chamber 100 with the ambient environment may be via a suitable aseptically sealable access door 102, schematically shown in broken outline in FIG. 1A. Suitable sealable doors and ports are well known in the art and will not be dwelt upon further in this specification. The ambient environment may be, for example, a clean room adapted for the handling of pharmaceuticals during production. Since space is at a premium in such spatially constrained clean environments, there is much merit in reducing the so-called "footprint" of equipment to be housed in the clean environment.

The terms "aseptic" and "sterilize" and their derivatives are to be understood as follows for the purposes of the present specification. Establishing an aseptic condition in the interior of a chamber shall be understood to mean establishing that condition throughout the internal atmosphere of the chamber as well as on substantially all exposed interior surfaces of the chamber. This shall include the surfaces of all items, containers, subsystems and the like exposed to the interior atmosphere of the chamber. To the extent that extremely tight crevices or microscopic crevices may exist in the interior of the chamber such that a sterilizing gas or vapor may not perfectly penetrate into such tight regions, for example, the degree of sterilization in practical cases may not be total. This is acknowledged in both the industry and in the standards set for the industry. The action of establishing an aseptic condition within the interior of the chamber and "sterilizing the interior of the chamber" shall have the same meaning in this specification.

Introducing into the interior of a chamber with an aseptic condition an item of which the surfaces are not suitably sterilized destroys the existing aseptic condition within the chamber. Conversely, introducing an aseptic or sterilized item into an interior of a chamber that does not have an aseptic condition within that interior does not render that interior aseptic. In fact, all it does is to destroy the aseptic condition of the surface of the item so introduced. Similarly, introducing filtered air, even with all biological entities filtered out, into an unsterilized chamber does not in any way sterilize the chamber or render it aseptic to a degree acceptable in the pharmaceutical industry. The reason is that the interior surfaces of the chamber are not sterilized by the introduction of such air. All that is achieved is to contaminate the filtered air with active biological species resident on the interior surfaces of the unsterilized chamber.

In the interest of clarity and completeness, it should also be recorded that in the art the term "aseptic" is also sometimes used in association with the introduction of pharmaceutical fluids along aseptic tubes into bodies within controlled chambers. In such cases the term in the art refers to the condition inside the tube or to the fact that the pharmaceutical fluid may be filtered to a suitable degree. This in no way sterilizes or renders aseptic the interior of the chamber in question. The aseptic condition in such cases is confined to the interior of the tube bearing the pharmaceutical stream. Such streams are often filtered to a high degree, but such filtering affects only the interior of the particular tube and does not in any way sterilize the interior of the chamber.

In some prior art systems, containers introduced into a chamber for the purposes of being filled with a pharmaceutical are routed through sterilizing subsystems. This kills biological species on the containers. When such sterilized containers are introduced into the chamber when the chamber itself is not aseptic the containers lose their aseptic condition as biological species contained within the chamber will deposit on the previously aseptic containers.

It should also be pointed out that pharmaceutical or semiconductor clean rooms of any quality level, including "Class 100", "Class 10" or "Class 1", even when employing laminar flow hoods and the like or any quality of HEPA (High Efficiency Particulate Air) filters or ULPA (Ultra Low Particulate Air) filters, cannot constitute an aseptic chamber because they do not have an assurable means to render the surfaces of the room sterile or aseptic. Standards for clean rooms exist from both the United States Federal Government and ISO (International Standards Organization). These specify in great detail to different standards the allowed particulate content of a cubic volume of air in such a clean room facility. None of these standards address the matter of biological species present on surfaces in the room. This serves to make the point that a chamber cannot be rendered aseptic by the management of its atmosphere or airflow only. Nor, conversely, can the chamber be rendered aseptic by the sterilization of only the surfaces of its interior.

The text "Guideline for Disinfection and Sterilization in healthcare Facilities, 2008" by Rutala et al from the Center for Disease Control lists a compendium of mechanisms and methods for sterilization. Our concern in this specification is specifically with those mechanisms for sterilizing the interior of a chamber; that is, sterilizing both the interior surfaces and the atmosphere within the chamber. Given the requirements, vapor base methods are most appropriate to the task. These include, but are not limited to, treatment with heated water vapor, hydrogen peroxide vapor, ozone, nitrogen dioxide, ethylene oxide, glutaraldehyde vapor or other suitable sterilizing gases and vapors. In one suitable method appropriate to the present invention, the sterilization is by means of hydrogen peroxide vapor which is then flushed using ozone before the chamber is employed in the filling of pharmaceutical containers.

The subsystems of the apparatus 1000 contained with sealable chamber 100 will now be described at the hand of FIG. 1A to FIG. 1G. Due to the compactness and density of components and subsystems of apparatus 1000, certain components and subsystems are omitted from the drawings of FIG. 1B to FIG. 1G in the interest of clarity and the focus is placed on components and subsystems most relevant to the supporting text in this specification. Planar rotary stage 130 is fully rotatable through 360 degrees in a horizontal plane parallel to lower wall 120 about rotary stage rotation axis 131 and may be raised and lowered by means of bellows feed-through 190. The use of bellows feed-through 190 allows chamber 100 to retain its aseptic condition during the motion of rotary stage 130. A suitable engine and gearing system 320 may be housed within chamber 300. Engines, for example stepper motors, as well as gearing systems suitable for rotating rotary stage 130 with suitable angular precision and repeatability are well known in the art and are not further discussed in this specification.

Figure 1B:
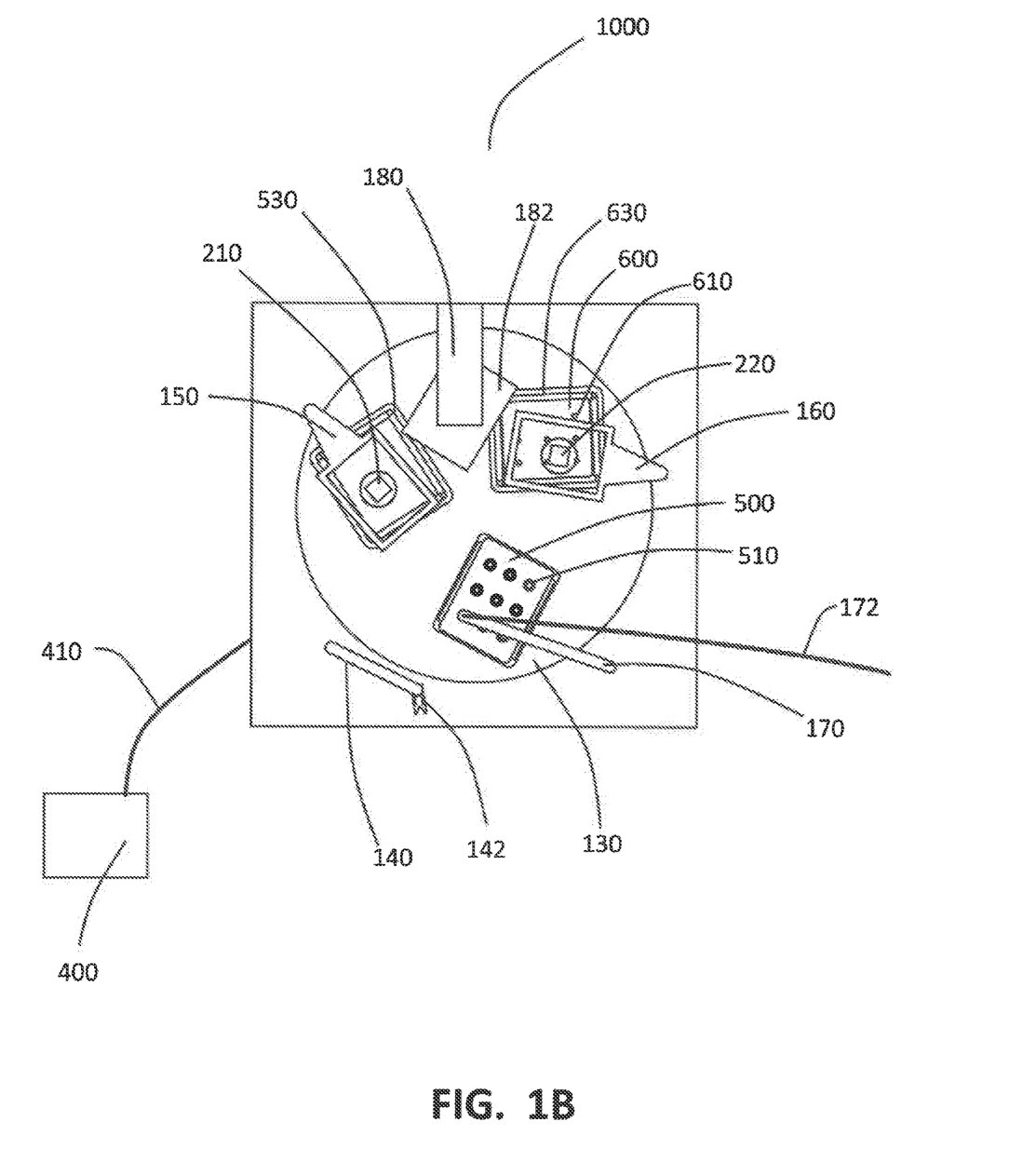
FIG. 1B is a plan view of one chamber of the apparatus of FIG. 1A.
Figure 1C:
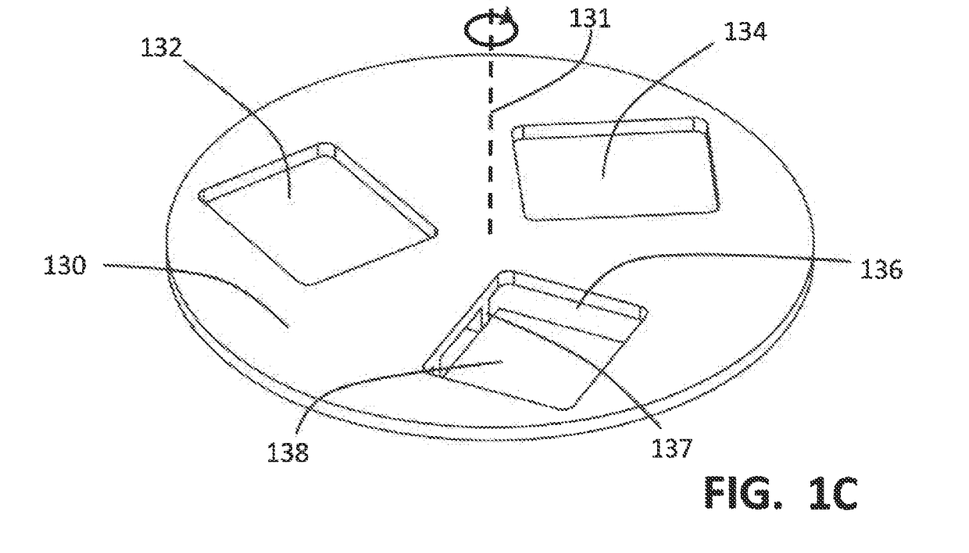
FIG. 1C shows a rotary stage of the apparatus of FIG. 1A and FIG. 1B.

As shown in FIG. 1C, at least three fiducial locating openings 132, 134, and 136 are provided in rotary stage 130. Fiducial locating opening 132 is employed for receiving container tubs 530 holding sterilized pharmaceutical containers 510 pre-packed in container nests 500. The container tubs 530 are sealed with a lower surface of peelable tub covers 520. Suppliers of pharmaceutical containers provide their product in this format to users of the apparatus of the present specification. Fiducial locating opening 134 is employed for receiving container closure tubs 630 holding sterilized pharmaceutical containers closures 610 pre-packed in container closure nests 600. The container closure tubs 630 are sealed with peelable tub covers not shown in FIG. 1A to FIG. 1G. The peelable covers of tubs 630 are functionally identical to peelable covers 520. Suppliers of pharmaceutical containers provide their product in this format to users of the apparatus of the present specification. In the interest of the compactness of system 1000, the rectangular axes of locating openings 132, 134, and 136 may be oriented at an angle with respect to the radial direction of the rotary stage 130 in order to ensure a suitably small radius for rotary stage 130.

Suitable container nests 500 and container closure nests 600; container tubs 530 and container closure tubs 630; and peelable tub covers 520 are described in co-pending U.S. patent application Ser. No. 14/912,145, the specification of which is hereby incorporated in full. Alternative cover gripping arrangements for the removal of tub covers from tubs are also described in co-pending U.S. patent application Ser. No. 14/398,538, the specification of which is hereby incorporated in full. In those reference applications, the term "cover" may used to describe any surface material, including but not limited to a flexible sheet made of plastic material, a polymeric membrane or an impermeable laminated foil. Optionally, tub covers may be highly permeable to gases and decontamination agents. Certain materials have susceptibility to significant absorption of decontamination agents during decontamination of the transfer chamber. Exposure of pre-sterilized materials of tub to decontamination agents may be prevented by use of an impermeable cover, or by addition of an impermeable layer on top of the cover. Suitable methods for adding such an impermeable layer includes, without limitation adhesive film and heat seals. In another aspect of this invention, the transfer chamber may be a vacuum chamber; and may be configured to sterilize the contents of the tub. Thermal and fast non-thermal sterilization cycles are well known in the art. The fast cycle time of non-thermal sterilization cycles may be particularly advantageous. Such cycles are typically used in hospital settings, for example for sterilization of surgical instruments. Gaseous sterilization agents may be hydrogen peroxide, ozone and combinations thereof. The transfer chamber may be equipped with a plasma generator for rapid activation and removal of sterilization agents. The addition of a non-thermal sterilizing transfer chamber to the controlled environment enclosure is particularly well suited for processing of nested pharmaceutical container materials.

In the interest of clarity, FIG. 1A to FIG. 1G show, and the associated text to follow below will describe, the use of a single tub 530 of pharmaceutical containers 510 along with a single tub 630 of container closures 610. In practice, container closures 610 are provided as multiple nests 600 per container closure tub 630. To this end rotary stage 130 may contain more than one fiducial locating opening 132 to each receive a container tub 530 holding sterilized pharmaceutical containers 510 pre-packed in one container nest 500. In yet other implementations, more than one nest 500 of containers 510 may be present in a single pharmaceutical container tub 530.

Fiducial locating opening 136 is specifically arranged to receive container nests 500 bearing pharmaceutical containers 510. Whereas tubs 530 and 630 naturally locate in fiducial locating openings 132 and 134 and are suspended by their own rims once in opening 132 and 134, containers 510 are correctly located in opening 136 and retained in position by some other means. To this end, fiducial locating opening 136 comprises four fiducial retaining guides 137. Baseplate 138 is located within fiducial locating opening 136 as a loose component of system 1000, and rests on the horizontal portions at the bottoms of each of the four fiducial retaining guides 137 (see FIG. 1C and FIG. 1D). This arrangement allows baseplate 138 to move freely, guided by the fiducial retaining guides 137. We shall return to this arrangement when discussing the closing of containers with container closures.

Figure 1D:
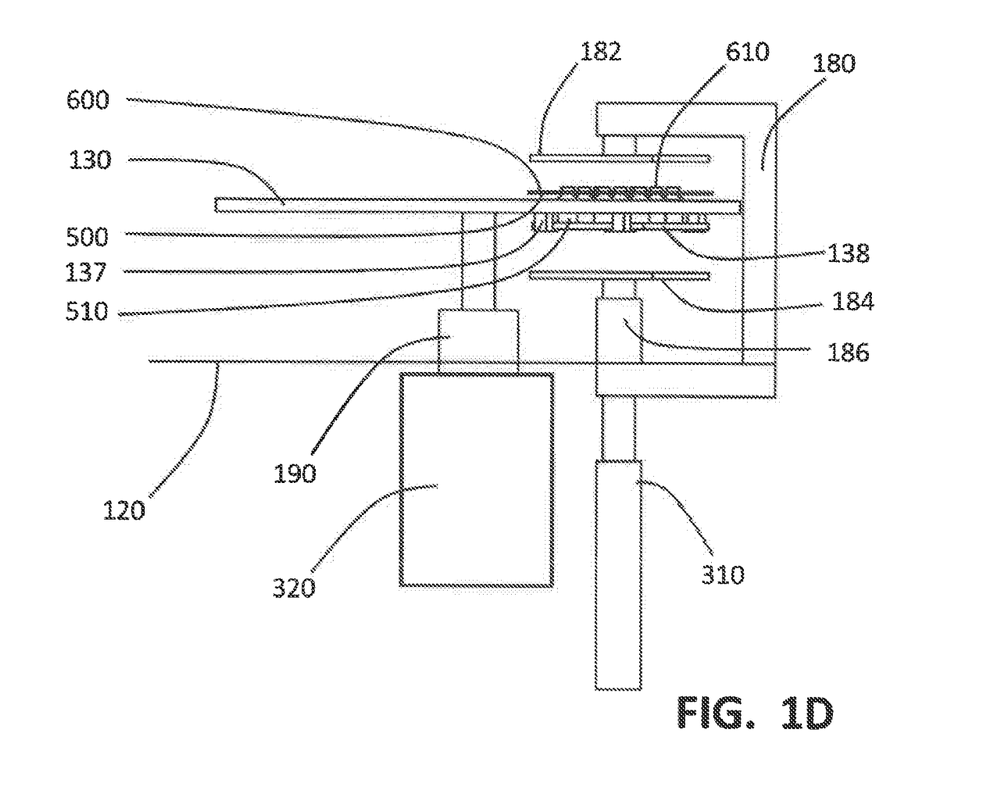
FIG. 1D shows a side view of a portion of the apparatus of FIG. 1A and FIG. 1B.
Figure 1E:
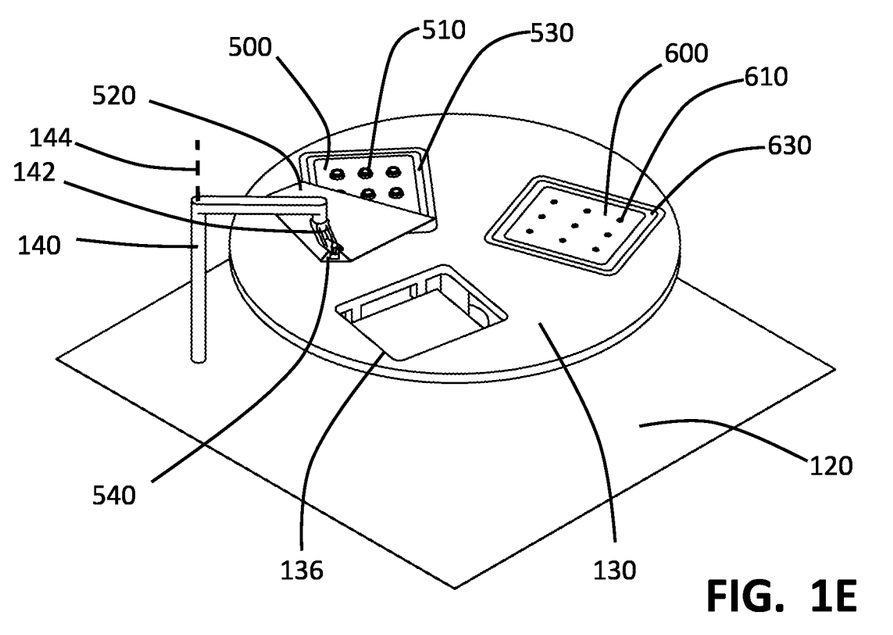
FIG. 1E shows a pharmaceutical container tub cover seated in the rotary stage of FIG. 1A to FIG. 1D being removed.

FIG. 1E shows fiducial locating opening 136 as empty, while a cover 520 is being peeled from container tub 530 in fiducial locating opening 132 (not visible) to expose nest 500 bearing pharmaceutical containers 510. At this point in the operation of system 1000, a cover similar to cover 520 has already been pealed from tub 630 in fiducial locating opening 134 (not visible) to expose nest 600 bearing container closures 610. FIG. 1G shows a close-up detailed view of the peeling of cover 520. Cover removal station 140 is rotatable about cover removal station rotation axis 144 parallel to rotary stage rotation axis 131 and comprises an engagement tool 142, which, in this particular embodiment, is fork-shaped in order to engage with a cover removal fixture 540 attached to an upper surface of cover 520. Cover removal fixture 540 is pre-attached to the upper surface of cover 520 before tub 530 is transferred into system 1000 via door 102 (See FIG. 1A). In the embodiment shown in FIG. 1E and FIG. 1G, cover removal fixture 540 is clipped to the upper surface of cover 520 and has a ball-shaped appendage to allow it to be engaged by engagement tool 142. Other combinations of cover removal fixtures and engagement tools are contemplated and system 1000 is not limited to the particular combination of cover removal fixture and engagement tool shown in FIG. 1A, FIG. 1E and FIG. 1G. Rotary stage 130 may be lowered to assist in obtaining a less acute angle between cover 520 and tub 530. Too acute an angle can lead to the tearing of cover 520. Cover removal station 140 can be rotated while rotary stage 130 rotates so that the combined motions of cover removal station 140 and rotary stage 130 provide a low stress path for the removal of cover 520, thereby limiting the chances of tearing of cover 520. In particular, cover removal station 140 may be rotated to ensure that engagement tool 142 is not present above fiducial locating opening 132 when container tub 530 is placed in or removed from fiducial locating opening 132.

In some embodiments, system 1000 comprises a single cover removal station 140 for sequentially removing covers from tubs 530 and 630. In other embodiments, system 1000 may be equipped with two or more cover removal stations 140 for dedicated removal of covers from tubs 530 and 630 and other additional tubs. In some embodiments covers are simultaneously removed from tubs 530 and 630 and from other tubs, all the removal processes benefiting from a single rotary motion of rotary stage 130.

Figure 1F:
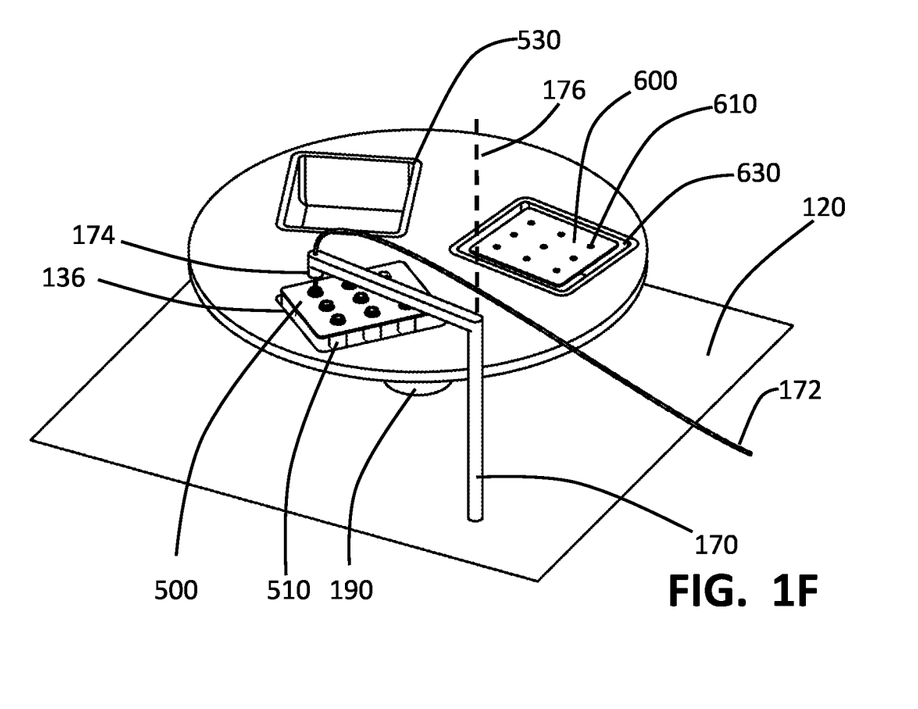
FIG. 1F shows pharmaceutical containers being filled with a pharmaceutical fluid substance in the apparatus of FIG. 1A to FIG. 1E.
Figure 1G:
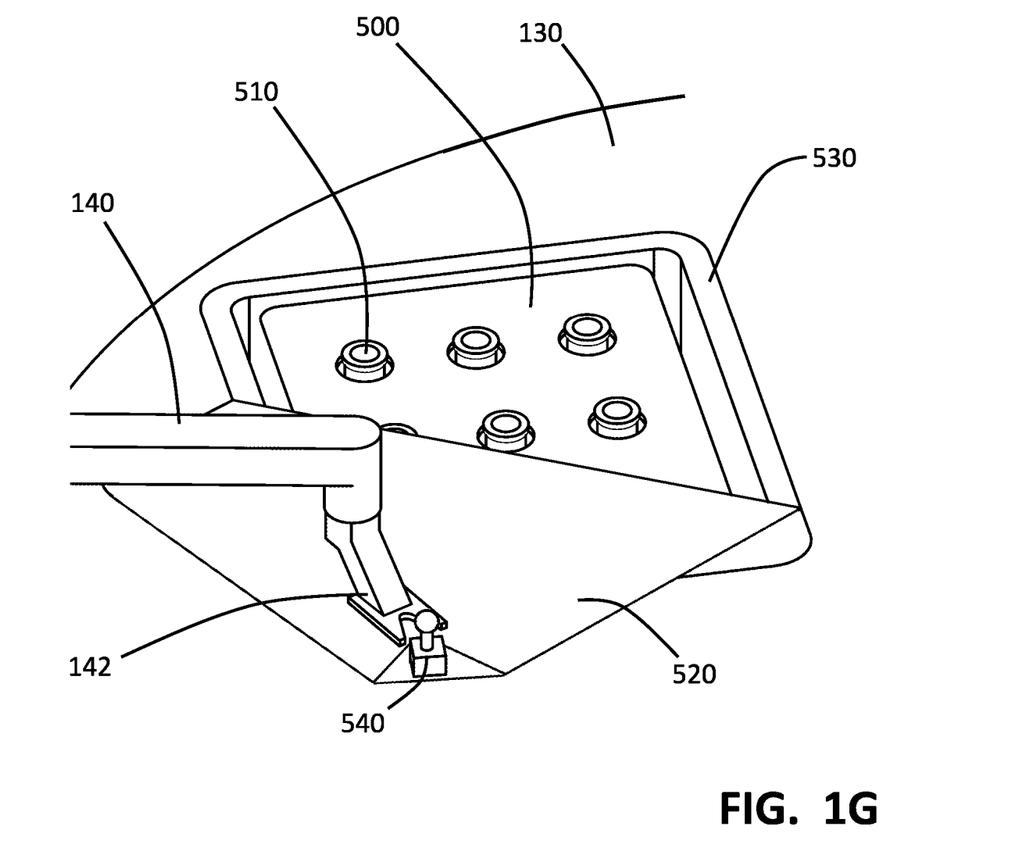
FIG. 1G provides a more detailed view of the cover removal components of the apparatus of FIG. 1A, FIG. 1B and FIG. 1E.

In FIG. 1A, FIG. 1B, and FIG. 1F a filling station 170 for filling pharmaceutical containers 510 with pharmaceutical fluid product comprises pharmaceutical fluid product feed line 172 supplying pharmaceutical fluid product to a pharmaceutical fluid product dispenser head 174 (See FIG. 1F). Filling station 170 is rotatable about filling station rotation axis 176 parallel to rotary stage rotation axis 131. Filling station 170 and rotary stage 130 can simultaneously or sequentially rotate to place dispenser head 174 over an opening of any selected container 510 in nest 500 when nest 500 is seated in fiducial locating opening 136. This allows every container 510 in nest 500 to be filled with pharmaceutical fluid product by product dispenser head 174. When not engaged in filling containers 510, filling station 170 may be rotated to swing dispenser head 174 completely away from fiducial locating opening 136, thereby allowing nests 600 bearing container closures 610 to be placed on top of nest 500 with a closure 610 directly on top of an opening of every container 510 residing in fiducial locating opening 136.

Another term employed to describe dispenser head 174 is "filling needle". Suitable filling needles and protective sheathing arrangements for such filling needles are described in co-pending U.S. patent application Ser. Nos. 14/890,223 and 15/199,771, the specifications of which are hereby incorporated in full.

FIG. 1A and FIG. 1B show two vacuum pickup systems 150 and 160, each respectively comprising a plurality of suction cups 152 and 162 (See FIG. 1B). Vacuum pickup system 150 is arranged to pick up nests 500 of containers 510 by means of suction cups 152, and vacuum pickup system 160 is arranged to pick up nests 600 of containers 610 by means of suction cups 162. Vacuum pickup system 160 may be raised and lowered in order to allow suction cups 162 to engage with different nests 600 of container closures 610 contained at differing depths inside tub 630. To this end, vacuum pickup system 160 may comprise a bellows feed-through allowing vertical motion whilst maintaining the aseptic integrity of chamber 100. Suitable vacuum pumps, or vacuum lines from a vacuum source external to system 1000, may be connected to vacuum pickup systems 150 and 160, and ensure suitable vacuum at the suction cups 152 and 162.

Cameras 210 and 220 are disposed to view and record the positioning of suction cups 152 and 162 on nests 500 and 600 respectively. In the embodiment shown in FIG. 1A, cameras 210 and 220 are disposed within chamber 200 and view nests 500 and 600 through sealed windows 112 and 122 respectively. In other embodiments, cameras 210 and 220 may be disposed within chamber 100 and view nests directly from within chamber 100.

Container closing ram system 180, shown in FIG. 1A, FIG. 1B, and FIG. 1D, comprises upper ram plate 182 disposed within chamber 100 above rotary stage 130, lower ram plate 184 disposed within chamber 100 below rotary stage 130, and ram drive 310 within chamber 300. Ram drive 310 is disposed for driving lower ram plate 184 vertically toward upper ram plate 182 via bellows feed-through 186. Loose base plate 138 of fiducial locating opening 136, when located above lower ram plate 184 by suitably rotating rotary stage 130, is pushed upward by ram plate 184 and is guided in the process by the fiducial retaining guides 137 (See FIG. 1D). When the closures 610 in closure nest 600 are ultimately pushed against upper ram plate 182, they are forced into the openings of the containers 510 in nest 500. This creates a sandwiched nest of closed containers 510, each closed by a corresponding closure 610. As shown in FIG. 1D, nests 500 and 600 are forced together in the process to create a compound nest 500/600.

Controller 400, shown in FIG. 1A and FIG. 1B, may communicate with the rest of system 1000 via control communications line 410, or may be contained physically within system 1000, for example, within chamber 200. Controller 400 may have suitable memory and a processor contain suitable software programming instructions which, when loaded in the memory executed by the processor, control the motions of ram system 180, vertical motion and rotating action of rotary stage 130, the application of vacuum to vacuum pickup systems 150 and 160, the imaging by cameras 210 and 220, the vertical motion of vacuum pickup system 160, any rotational or vertical motions required from cover removal stations 140 and filling station 170, as well as the on-and-off valving of the pharmaceutical fluid product supply to dispenser head 174. Suitable valves and pumps, typically peristaltic pumps, required for the pharmaceutical fluid product supply to dispenser head 174 are well known in the art and may be housed in chamber 200 or may be located outside system 1000. The various mechanical drives for the subsystems described above are well-known in the art, will not be discussed here in detail. These may typically be housed in chamber 200 of system 1000. The software, when executed by the processor, instructs the rotary stage to rotate to angular positions that are either predetermined or based on image information from the cameras and controls the cover removal stations, the filling station, the vacuum pickup systems, and the ram system to operate specifically in conjunction with the rotary stage.

Figure 2A:
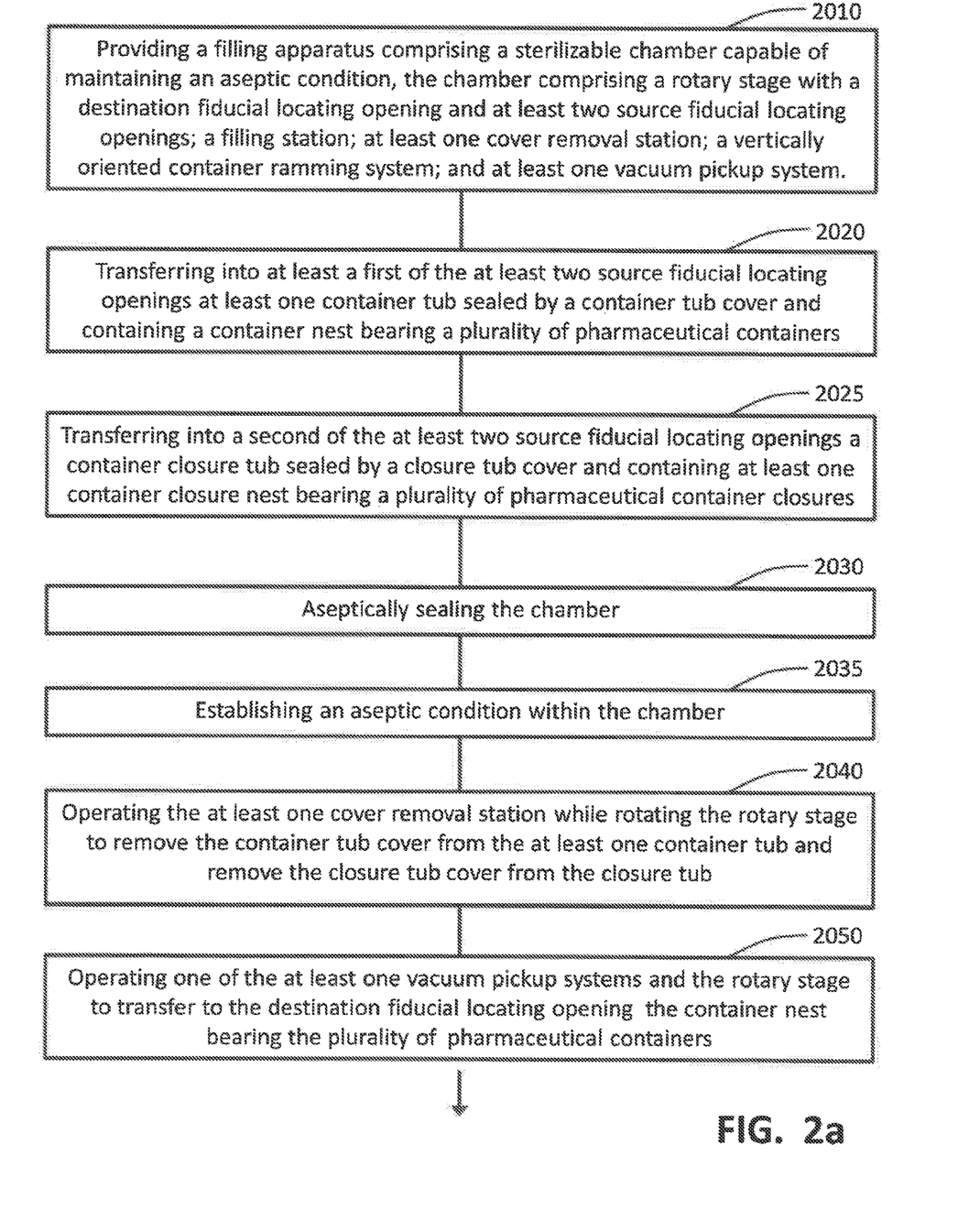
FIG. 2A and FIG. 2B jointly form a drawing of a flow chart for a method of aseptically filling pharmaceutical containers with a pharmaceutical fluid substance in a spatially constrained environment.
Figure 2B:
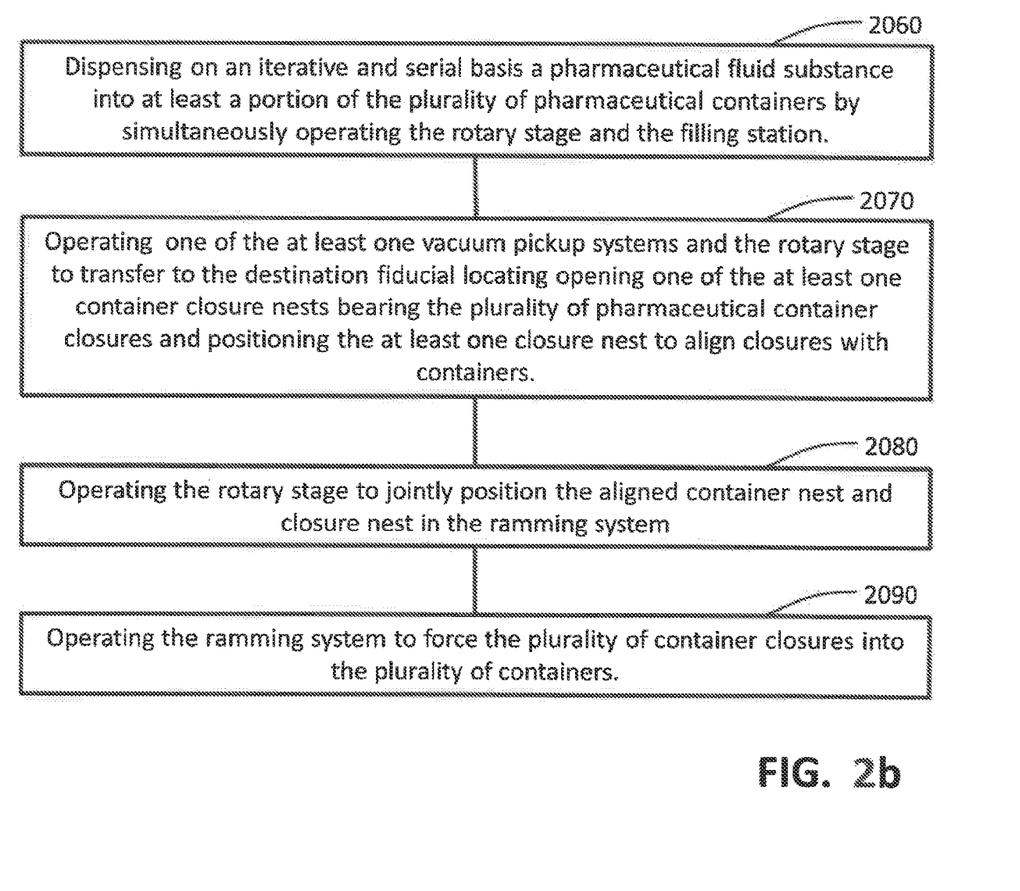

A method based on system 1000 for filling nested pharmaceutical containers with a pharmaceutical fluid product will now be described at the hand of the flow chart given in FIG. 2. The method comprises providing [2010] a filling apparatus 1000 comprising a sterilizable chamber 100 capable of maintaining an aseptic condition, the chamber comprising a rotary stage 130 with a destination fiducial locating opening 136 and at least two source fiducial locating openings (132 and 134); a filling station 170; at least one cover removal station 140; a vertically oriented container ramming system 180; and at least one vacuum pickup system (for example 150 and/or 160). The method further comprises transferring [2020] into at least a first of the at least two source fiducial locating openings (132 and 134) at least one container tub 530 sealed by a container tub cover 520 and containing a container nest 500 bearing a plurality of pharmaceutical containers 510; and transferring [2025] into a second of the at least two source fiducial locating openings (134 and 132) a container closure tub 630 sealed by a closure tub cover and containing at least one container closure nest 600 bearing a plurality of pharmaceutical container closures 610.

The method further comprises aseptically sealing [2030] the chamber 100 and establishing [2035] an aseptic condition within the chamber 100. The establishing [2035] an aseptic condition within the chamber 100 may comprise treating the interior of chamber 100 with any one or more of steam, hydrogen peroxide vapor, ozone, nitrogen dioxide, and ethylene oxide.

The method further comprises operating [2040] the at least one cover removal station 140 and rotating the rotary stage 130 to remove the container tub cover 520 from the at least one container tub 530 and remove the closure tub cover from the closure tub 630; operating [2050] the rotary stage 130 and one of the at least one vacuum pickup systems (for example 150 and/or 160) to transfer to the destination fiducial locating opening 136 the container nest 500 bearing the plurality of pharmaceutical containers 510; and dispensing [2060] on an iterative and serial basis a pharmaceutical fluid substance into at least a portion of the plurality of pharmaceutical containers 510 by operating the rotary stage 130 and the filling station 170. The phrase "iterative and serial" is employed in this specification to describe the fact that the same operational steps are repeatedly used to fill the various containers and the fact that the containers are filled one after another, as opposed to simultaneously. In some embodiments multiple containers may be simultaneously filled using a filling station with multiple dispenser heads.

Steps [2040], [2050], and [2060] each involves rotating the rotary stage 130 and operating another device, being respectively the cover removal station 140, one of the at least one vacuum pickup systems (for example 150 and/or 160), and the filling station 170. The motions involved may be simultaneous in some cases or embodiments, and serial in other cases or embodiments. In some embodiments some of the motions may be simultaneous and others may be serial.

The operating [2040] the at least one cover removal station 140 may comprise engaging an engagement tool (for example tool 142) with a cover removal fixture (for example fixture 540) pre-attached to the cover being removed. Operating [2050] one of the at least one vacuum pickup systems may comprise contacting the container nest 500 with a plurality of suction cups 152 while applying a vacuum to the suction cups 152. The dispensing [2060] a pharmaceutical fluid substance into at least a portion of the plurality of pharmaceutical containers may comprise disposing on an iterative and serial basis a fluid product dispenser head 174 of the filling station 170 over the openings of the at least a portion of the plurality of pharmaceutical containers 510. The operating [2050] the rotary stage 130 and one of the at least one vacuum pickup systems may comprise operating a camera 210 to obtain image information of the container nest 500 bearing the plurality of pharmaceutical containers 510 and to position the one of the at least one vacuum pickup systems over the container nest 500.

The method further comprises operating [2070] one of the at least one vacuum pickup systems (for example 150 and/or 160) and the rotary stage 130 to transfer to the destination fiducial locating opening 136 one of the at least one container closure nests 600 bearing the plurality of pharmaceutical container closures 610 and positioning the at least one closure nest 600 to align closures 610 with containers 510; operating [2080] the rotary stage 130 to jointly position the aligned container nest 500 and closure nest 600 in the ramming system 180; and operating [2090] the ramming system 180 to force the plurality of container closures 610 into the plurality of containers 510. Operating [2070] one of the at least one vacuum pickup systems may comprise contacting the container closure nest 600 with a plurality of suction cups 162 while applying a vacuum to the suction cups 162. Operating [2090] the ramming system 180 may comprise driving the plurality of pharmaceutical containers 510 toward an upper ram plate 182 of the ramming system 180. The operating [2070] the rotary stage 130 and one of the at least one vacuum pickup systems may comprise operating a camera 220 to obtain image information of the one of the at least one container closure nests 600 bearing the plurality of pharmaceutical container closures 610 and to position the one of the at least one vacuum pickup systems over the one of the at least one container closure nests 600.

The providing [2010] a filling apparatus may comprise providing a filling apparatus further comprising a controller 400 and a software program executable by controller 400. Any one or more of the aseptically sealing [2030] the chamber 100; establishing [2035] an aseptic condition within the chamber 100; operating the rotary stage 130; operating the at least one cover removal station 140; operating [2070] one of the at least one vacuum pickup systems (150 and/or 160); operating the filling station 170; and operating [2090] the ramming system 180 may be done automatically by executing the software program in the controller.

In the embodiment described at the hand of FIGS. 1A to 1F, each of steps [2040], [2050], [2060], [2070], and [2080] comprises rotating a rotary stage, for example rotary stage 130, bearing the container nests and container closure nests.

In other embodiments a plurality of the steps of removing a container tub cover from at least one container tub 530; removing a container tub cover from at least one container closure tub 630; transferring to the destination fiducial locating opening 136 the container nest 500; dispensing a pharmaceutical fluid substance into pharmaceutical containers 510; transferring to the destination fiducial locating opening 136 one of the at least one container closure nests 600; and positioning the aligned container nest 500 and closure nest 600 in the ramming system 180 comprises rotating a rotary stage bearing the container nests and container closure nests.

In a general embodiment, at least one of the steps of removing a container tub cover from at least one container tub 530; removing a container tub cover from at least one container closure tub 630; transferring to the destination fiducial locating opening 136 the container nest 500; dispensing a pharmaceutical fluid substance into pharmaceutical containers 510; transferring to the destination fiducial locating opening 136 one of the at least one container closure nests 600; and positioning the aligned container nest 500 and closure nest 600 in the ramming system 180 comprises rotating a rotary stage bearing the container nests and container closure nests.

It is to be noted that neither filling system 1000, nor the associated method, needs to employ the vibratory bowls or escapements that are typical of the prior art. Unlike many prior art systems, filling system 1000 also does not require the use of gloves for use by the operator to access the interior of the chamber.

The system above has been described as employing a controller that runs stored software running on a general-purpose computer platform, but it could also be implemented in whole or in part using special-purpose hardware.

The system described above also employs fiducial openings defined in the rotary stage to hold the tubs and nests, but it could also employ other types of fiducial structures that include other configurations of constraining surfaces sufficient to hold the tubs and nests in place. Notched posts mounted on the rotary stage could hold the tubs and/or nests above the rotary stage, for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A container tub assembly of for holding nested and sterilized pharmaceutical container parts, comprising:
a container tub defining an interior adapted to hold the nested and sterilized pharmaceutical container parts, comprising:
a bottom,
a lip having a sealing surface with a peripheral outline, and
sidewalls located between the bottom and the lip,
a gas impermeable peelable container cover consisting of a sheet of flexible material
sealed to the sealing surface of the lip of the container tub to seal the nested and sterilized pharmaceutical container parts, and
a cover removal fixture on the container cover, the cover removal fixture having an appendage that is structured and arranged to be engageable by a forked engagement tool;
wherein the cover removal fixture is detachably clipped to a portion of the peelable container cover that extends outside of the peripheral outline of the sealing surface of the container.

2. The container tub assembly of claim 1 wherein the gas impermeable container cover includes a portion that extends outside of the peripheral outline of the sealing surface of the container tub, and the cover removal fixture is on the portion of the gas impermeable container cover that extends outside of the peripheral outline of the top sealing surface of the container tub.

3. The container tub assembly of claim 1 wherein the container tub is rectangular and includes four sidewalls.

4. The container tub assembly of claim 1 wherein the gas impermeable container cover is heat sealed to the sealing surface of the lip of the container tub to seal the contents of the container against a decontamination process.

5. The container tub assembly of claim 4 wherein the container tub assembly is configured for the decontamination process to be effected by a decontamination agent, the decontamination agent being one of a decontamination gas, a decontamination irradiation, and a decontamination plasma.

6. The container tub assembly of claim 4 wherein the gas impermeable container cover is sealed to the sealing surface of the lip of the rectangular container to seal the contents of the container against the decontamination process using a chemical agent including at least one of heated water vapor, hydrogen peroxide vapor, ozone, nitrogen dioxide, chlorine dioxide, ethylene oxide and glutaraldehyde vapor.

7. The container tub assembly of claim 4 wherein the gas impermeable container cover is sealed to the sealing surface of the lip of the container tub to seal the contents of the container tub against the decontamination process using an irradiation including at least one of at least one of ultraviolet irradiation and electron beam irradiation.

8. The container tub assembly of claim 4 wherein the gas impermeable container cover is sealed to the sealing surface of the lip of the container tub to seal the contents of the container against the decontamination process using plasma.

9. The container tub assembly of claim 1 wherein the peelable gas impermeable container cover is made of a plastic material.

10. The container tub assembly of claim 1 wherein the peelable gas impermeable container cover is made of an impermeable laminated foil.

11. The container tub assembly of claim 1 wherein the peelable gas impermeable container cover is made of a polymeric membrane.

12. The container tub assembly of claim 1 wherein the sealed container tub holds sterilized pharmaceutical containers or closures.

13. The container tub assembly of claim 1 wherein the sealed container tub holds a plurality of containers disposed in a container nest.

14. The container tub assembly of claim 1 wherein the sealed container tub holds a plurality of container nests, each of the container nests holding a plurality of containers.

15. The container tub assembly of claim 1 wherein the sealed container tub holds a plurality of closures disposed in a closure nest.

16. The container tub assembly of claim 1 wherein the sealed container tub holds a plurality of closure nests, each of the closure nests holding a plurality of closures.

17. A container tub assembly for holding nested and sterilized pharmaceutical container parts, comprising:
a container tub defining an interior adapted to hold the nested and sterilized pharmaceutical container parts, comprising:
a bottom,
a lip having a sealing surface with a peripheral outline, and
sidewalls located between the bottom and the lip,
a gas impermeable peelable container cover consisting of a sheet of flexible material sealed to the sealing surface of the lip of the container tub to seal the nested and sterilized pharmaceutical container parts held in the container, and
a cover removal fixture clipped on the container cover and extending above the container cover, the cover removal fixture having an appendage that is structured and arranged to be engageable by a forked engagement tool above the container cover.

18. A container tub assembly for holding nested and sterilized pharmaceutical container parts, comprising:
a container tub defining an interior adapted to hold the nested and sterilized pharmaceutical parts, comprising:
a bottom,
a lip having a sealing surface with a peripheral outline, and
sidewalls located between the bottom and the lip,
gas impermeable peelable container cover consisting of a sheet of flexible material sealed to the sealing surface of the lip of the container tub to seal the nested and sterilized pharmaceutical container parts held in the container, and
a cover removal fixture on the container cover, the cover removal fixture having an engagement portion clipped to the container cover, the cover removal fixture having an appendage that is structured and arranged to be engageable by a forked engagement tool.

19. The container tub assembly of claim 17 wherein the gas impermeable peelable container cover includes a portion that extends outside of the peripheral outline of the sealing surface of the container tub, and the cover removal fixture is on the portion of the gas impermeable container cover that extends outside of the peripheral outline of the top sealing surface of the container tub.

20. The container tub assembly of claim 17 wherein the container tub is rectangular and includes four sidewalls.

21. The container tub assembly of claim 17 wherein the container tub assembly is configured for the decontamination process to be effected by a decontamination agent, the decontamination agent being one of a decontamination gas, a decontamination irradiation, and a decontamination plasma.

22. The container tub assembly of claim 21, wherein the gas impermeable peelable container cover is heat sealed to the sealing surface of the lip of the container tub to seal the contents of the container against a decontamination process.

23. The container tub assembly of claim 22 wherein the gas impermeable peelable container cover is sealed to the sealing surface of the lip of the rectangular container to seal the contents of the container against the decontamination process using a chemical agent including at least one of heated water vapor, hydrogen peroxide vapor, ozone, nitrogen dioxide, chlorine dioxide, ethylene oxide and glutaraldehyde vapor.

24. The container tub assembly of claim 22 wherein the gas impermeable peelable container cover is sealed to the sealing surface of the lip of the container tub to seal the contents of the container tub against the decontamination process using an irradiation including at least one of at least one of ultraviolet irradiation and electron beam irradiation.

25. The container tub assembly of claim 22 wherein the gas impermeable peelable container cover is sealed to the sealing surface of the lip of the container tub to seal the contents of the container against the decontamination process using plasma.

26. The container tub assembly of claim 17 wherein the gas impermeable peelable container cover is made of a plastic material.

27. The container tub assembly of claim 17 wherein the gas impermeable peelable container cover is made of an impermeable laminated foil.

28. The container tub assembly of claim 17 wherein the gas impermeable peelable container cover is made of a polymeric membrane.

29. The container tub assembly of claim 17 wherein the sealed container tub holds sterilized pharmaceutical containers or closures.

30. The container tub assembly of claim 17 wherein the sealed container tub holds a plurality of containers disposed in a container nest.

31. The container tub assembly of claim 17 wherein the sealed container tub holds a plurality of container nests, each of the container nests holding a plurality of containers.

32. The container tub assembly of claim 17 wherein the sealed container tub holds a plurality of closures disposed in a closure nest.

33. The container tub assembly of claim 17 wherein the sealed container tub holds a plurality of closure nests, each of the closure nests holding a plurality of closures.

34. The container tub assembly of claim 18 wherein the gas impermeable peelable container cover includes a portion that extends outside of the peripheral outline of the sealing surface of the container tub, and the cover removal fixture is on the portion of the gas impermeable container cover that extends outside of the peripheral outline of the top sealing surface of the container tub.

35. The container tub assembly of claim 18 wherein the container tub is rectangular and includes four sidewalls.

36. The container tub assembly of claim 18 wherein the container tub assembly is configured for the decontamination process to be effected by a decontamination agent, the decontamination agent being one of a decontamination gas, a decontamination irradiation, and a decontamination plasma.

37. The container tub assembly of claim 18 wherein the gas impermeable peelable container cover is heat sealed to the sealing surface of the lip of the container tub to seal the contents of the container against a decontamination process.

38. The container tub assembly of claim 37 wherein the gas impermeable peelable container cover is sealed to the sealing surface of the lip of the rectangular container to seal the contents of the container against the decontamination process using a chemical agent including at least one of heated water vapor, hydrogen peroxide vapor, ozone, nitrogen dioxide, chlorine dioxide, ethylene oxide and glutaraldehyde vapor.

39. The container tub assembly of claim 37 wherein the gas impermeable peelable container cover is sealed to the sealing surface of the lip of the container tub to seal the contents of the container tub against the decontamination process using an irradiation including at least one of at least one of ultraviolet irradiation and electron beam irradiation.

40. The container tub assembly of claim 37 wherein the gas impermeable peelable container cover is sealed to the sealing surface of the lip of the container tub to seal the contents of the container against the decontamination process using plasma.

41. The container tub assembly of claim 18 wherein the gas impermeable peelable container cover is made of a plastic material.

42. The container tub assembly of claim 18 wherein the gas impermeable peelable contain er cover is made of an impermeable laminated foil.

43. The container tub assembly of claim 18 wherein the gas impermeable peelable container cover is made of a polymeric membrane.

44. The container tub assembly of claim 18 wherein the sealed container tub holds sterilized pharmaceutical containers or closures.

45. The container tub assembly of claim 18 wherein the sealed container tub holds a plurality of containers disposed in a container nest.

46. The container tub assembly of claim 18 wherein the sealed container tub holds a plurality of container nests, each of the container nests holding a plurality of containers.

47. The container tub assembly of claim 18 wherein the sealed container tub holds a plurality of closures disposed in a closure nest.

48. The container tub assembly of claim 18 wherein the sealed container tub holds a plurality of closure nests, each of the closure nests holding a plurality of closures.

* * * * *